United States Patent [19]

Marten et al.

[11] Patent Number: 4,751,020
[45] Date of Patent: Jun. 14, 1988

[54] UV-FLUORESCENT CYANOACRYLATE ADHESIVE

[75] Inventors: Klaus Marten, Hilden; Heinz-Christian Nicolaisen, Hanover, both of Fed. Rep. of Germany

[73] Assignee: Henkel Kommanditgesellschaft auf Aktien, Duesseldorf, Fed. Rep. of Germany

[21] Appl. No.: 930,190

[22] Filed: Nov. 13, 1986

[30] Foreign Application Priority Data

Nov. 15, 1985 [DE] Fed. Rep. of Germany ....... 3540594

[51] Int. Cl.⁴ ............................................. C09K 11/02
[52] U.S. Cl. ......................... 252/301.21; 252/301.22; 252/301.28; 252/301.32; 524/84; 524/94; 524/106
[58] Field of Search .............. 252/301.21, 301.22, 252/301.24, 301.28, 301.32, 301.16; 524/94, 84, 106

[56] References Cited

U.S. PATENT DOCUMENTS

| | | | |
|---|---|---|---|
| 2,710,285 | 6/1955 | Truslen | 252/301.32 |
| 3,699,076 | 10/1972 | Thomsen | 524/719 |
| 4,006,158 | 2/1977 | Fleck et al. | 252/301.17 |
| 4,039,555 | 8/1977 | Sahm et al. | 252/301.24 |
| 4,061,860 | 12/1977 | Kormany et al. | 252/301.34 |
| 4,087,240 | 5/1978 | Reinert et al. | 252/301.21 |
| 4,405,750 | 9/1983 | Nakata et al. | 524/717 |
| 4,416,795 | 11/1983 | Martini et al. | 252/301.22 |

OTHER PUBLICATIONS

Database Chemical Description of Tinopal RBS ™.

Primary Examiner—John F. Niebling
Assistant Examiner—Steven P. Marquis
Attorney, Agent, or Firm—Ernest G. Szoke; Henry E. Millson, Jr.

[57] ABSTRACT

The invention relates to an α-cyanoacylate adhesive which is fluorescent in ultraviolet light. The adhesive contains a fluorescent compound selected from:
(a) Bis-benzoxazolyls having the following formula:

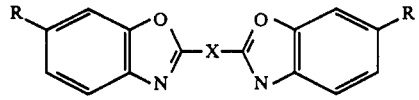

in which X is a thiophene ring or an ethylene group and R is H or a lower alkyl group; and (b) coumarin derivatives having the following formula:

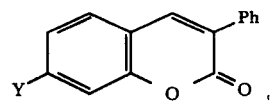

in which Ph is an aromatic radical and Y is a radical corresponding to

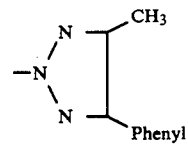

7 Claims, No Drawings

UV-FLUORESCENT CYANOACRYLATE ADHESIVE

BACKGROUND OF THE INVENTION

1. Field of the Invention

The present invention relates to quick-setting α-cyanoacrylate adhesives having good storage stability and a short setting time on a variety of different substrates.

2. Description of Related Art

Cyanoacrylate adhesives have been known for many years and are used in diverse formulations having varied setting characteristics and viscosities for various bonding applications. α-cyanoacrylates are basically colorless. It is known that the α-cyanoacrylates may be colored with suitable dyes to improve application control and to make the bonded areas permanently visible. Fluorescent dyes, such as C. I. Solvent Green 5, C. I. Acid Red 50 and C. I. Acid Red 52, have been used to dye α-cyanoacrylates for these purposes.

Although satisfactory technical results are generally obtained with these fluorescent dyes, it is desirable to incorporate fluorescent marking substances, which exhibit fluorescence only in specific spectral regions, into α-cyanoacrylic acid based adhesives.

DESCRIPTION OF THE INVENTION

It has now been discovered that it is possible to incorporate ultraviolet fluorescent compounds into the α-cyanoacrylate adhesive without adversely affecting the other properties of the adhesive. The present invention provides an α-cyanoacrylate adhesive which is fluorescent in ultraviolet light (i.e., uv-fluorescent). The uv-fluorescent α-cyanoacrylate adhesive contains a fluorescent compound selected from the group consisting of (a) bis-benzoxazolyls having the following formula:

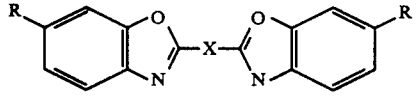

in which X is a thiophene ring or an ethylene group and R is hydrogen or a lower alkyl group; and (b) coumarin derivatives having the following formula:

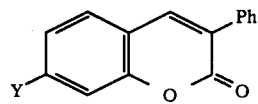

in which Ph is an aromatic radical and Y is a radical corresponding to:

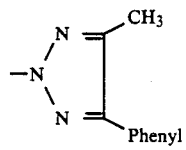

Particularly suitable bis-benzoxazolyls are those wherein R is a methyl group or a butyl group, preferably a tert.-butyl group. In the coumarin derivatives, the aromatic radical Ph is preferably a phenyl group. Suitable fluorescent compounds include commercial products referred to as "optical brighteners", such as those sold under the trademarks Blankophor, Tinopal, Hostalux and Uvitex.

Since the esters of α-cyanoacrylic acid are highly reactive compounds, not all so-called optical brighteners are suitable for use in the present invention. For instance, certain optical brighteners may adversely affect the setting time of the adhesive on metals, plastics, elastomers, wood, glass, etc., and are therefore unsuitable. Stability in storage can also be permanently affected by certain optical brighteners making their use in the present invention unsuitable. In addition, the optical brighteners should not adversely affect the transparency of the α-cyanoacrylate and should dissolve readily in the cyanoacrylate. Compounds which satisfy these requirements include for example, Uvitex OB and Blankophor CA 4410.

By contrast, it has been found that the addition of only minute amounts of Tinopal RBS can initiate premature polymerization of the cyanoacrylates at room temperature. Even with the addition of only a small amount (10 ppm) of one of these compounds, a cyanoethylacrylate otherwise stable for more than 1 year may be completely polymerized after only one week at room temperature.

The fluorescent compounds suitable for use in accordance with the present invention may be used in an amount of from about 10 to 5000 ppm. The particular amount of the fluorescent compound used is determined to a large extent by the desired level of fluorescence and also by the chemical composition of the fluorescent compound. In general, however, the fluorescent compounds are used in quantities of from about 10 to 500 ppm.

The cyanoacrylate adhesives used according to the present invention are based above all on esters formed by reacting α-cyanoacrylic acid with an alcohol. The ester constituent which is derived from the alcohol may be an alkyl group containing about 1 to 12 carbon atoms. The $C_1$-$C_{12}$ alkyl group may be non-substituted or substituted by a constituent such as a halogen atom, an alkoxy group, a straight-chain or branched-chain alkenyl group containing about 2 to 12 carbon atoms, an alkynyl group containing about 2 to 12 carbon atoms, a cycloalkyl group, an aralkyl group or an aryl group. Examples of constitutents such as these include methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl and 2-ethoxyethyl radicals.

In addition, the adhesive compositions of the present invention may contain standard additives, such as polymerization inhibitors for preventing premature anionic and/or radical polymerization, thickeners, plasticizers, perfumes, dyes, pigments, polymerization catalysts, and other agents conventionally added to adhesive compositions.

The following examples further illustrate the present invention; however, it is to be understood that the scope of the invention is not limited thereby.

EXAMPLES

Example 1

To two separate samples of an α-cyanoethylacrylate, each sample containing 100 ppm hydroquinone, approximately 500 ppm phosphoric acid and conventional amounts of $SO_2$, were added 10 ppm and 100 ppm of 2,5-bis-(5-tert.-butyl-2-benzoxazolyl)-thiophene (Uvitex OB), respectively. The Uvitex OB dissolved readily in the cyanoacrylate and did not affect its appearance. These mixtures were stored for 25 days at 60° C. together with a control mixture containing no Uvitex OB. The viscosity of each sample was measured (at 20° C.) immediately after mixing and at the end of the 25 day storage period.

The viscosities of the control sample containing no Uvitex OB and of the sample containing 10 ppm of Uvitex OB remained constant throughout the 25-day storage period at 50 mPa.s. The sample containing 100 ppm of the benzoxazolyl compound showed an increase in viscosity after 25 days of only 10% to 55 mPa.s.

The effect of Uvitex OB on the setting time of the adhesive was also determined. It was found that, in the case of the sample containing no Uvitex OB and in both of the samples to which Uvitex OB had been added, the setting time of the adhesive on an EPDM-substrate was 3 seconds, for all freshly prepared samples as well as all samples stored for 25 days at 60° C.

Example 2

To two separate samples of an α-cyanoethylacrylate, each sample containing 100 ppm hydroquinone, approximately 500 ppm phosphoric acid and conventional amounts of $SO_2$, were added 10 ppm and 100 ppm of a coumarin derivative containing a phenyl group in the 3-position (Blankophor CA 4410), respectively. The Blankophor CA 4410 dissolved readily in the cyanoacrylate and did not affect its appearance. These mixtures were stored for 25 days at 60° C. together with a control mixture containing no Blankophor CA 4410. The viscosity of each sample was measured (at 20° C.) immediately after mixing and at the end of the 25 day storage period.

The viscosities of the control sample containing no Blankophor CA 4410 and of the sample containing 10 ppm of Blankophor CA 4410 remained constant throught the 25-day storage period at 50 mPa.s. The sample containing 100 ppm of the coumarin derivative showed an increase in viscosity of only 10% to 55 mPa.s.

The effect of Blankophor CA 4410 on the setting time of the adhesive was also determined. It was found that, in the case of the sample containing no Blankophor CA 4410 and in both of the samples to which Blankophor CA 4410 had been added, the setting time of the adhesive on an EPDM-substrate was 3 seconds, for all freshly prepared samples as well as all samples stored for 25 days at 60° C.

Comparison Example

To separate samples of the same α-cyanoacrylate used in Examples 1 and 2 were added 100 ppm Tinopal RBS, respectively, followed by storage at 60° C. Complete polymerization of the α-cyanoacrylate occurred after only 6 hours, respectively.

DESCRIPTION OF PROPRIETARY COMPOUNDS

UVITEX OB: 2,5-bis-(5-t-butyl-2-benzoxazolyl)-thiophene

BLANKOPHOR CA4410: 3-phenyl-7-(4-methyl-5-phenyl-1,2,3-triazol-2-yl)-coumarin

TINOPAL SOP: disodium-4,4'-bis[4,6-dianilino-s-triazin-2-yl)-amino]-2,2'-stibenedisulfonate BLANKOPHOR is a trademark of: Bayer AG, Leverkusen, West Germany TINOPAL and UVITEX is a trademark of: Ciba-Geigy, Switzerland

We claim:

1. An ultraviolet fluorescent α-cyanoacrylate adhesive containing a fluorescent compound selected from the group consisting of:
   (a) bis-benzoxazolyls having the following formula:

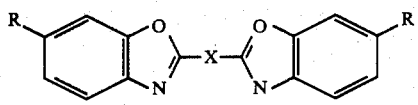

in which X is a thiophene ring or an ethylene group and R is hydrogen or a lower alkyl group; and
   (b) coumarin derivatives having the following formula:

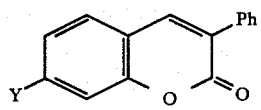

in which Ph is an aromatic radical and Y is a radical corresponding to

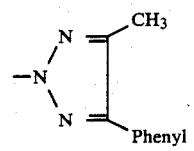

2. The adhesive of claim 1, wherein R is selected from the group consisting of methyl, butyl and tert.-butyl groups.

3. The adhesive of claim 1, wherein Ph comprises a phenyl group.

4. The adhesive of claim 1 containing about 10 to 5000 ppm of the fluorescent compound.

5. The adhesive of claim 1 containing about 10 to 500 ppm of the fluorescent compound.

6. The adhesive of claim 1, wherein the fluorescent compound comprises 2,5-bis-(5-tert-butyl-2-benzoxazolyl)-thiophene.

7. The adhesive of claim 1 containing one or more additives selected from the group consisting of polymerization inhibitors, thickeners, plasticizers, perfumes, dyes, pigments and polymerization catalysts.

* * * * *